US010582341B2

(12) United States Patent
Meredith et al.

(10) Patent No.: US 10,582,341 B2
(45) Date of Patent: *Mar. 3, 2020

(54) FACILITATING ESTIMATION OF MOBILE DEVICE PRESENCE INSIDE A DEFINED REGION

(71) Applicant: AT&T Mobility II LLC, Atlanta, GA (US)

(72) Inventors: Sheldon Kent Meredith, Marietta, GA (US); Jeremy Fix, Acworth, GA (US)

(73) Assignee: AT&T MOBILITY II LLC, Atlanta, GA (US)

(*) Notice: Subject to any disclaimer, the term of this patent is extended or adjusted under 35 U.S.C. 154(b) by 194 days.

This patent is subject to a terminal disclaimer.

(21) Appl. No.: 15/059,396

(22) Filed: Mar. 3, 2016

(65) Prior Publication Data
US 2016/0192155 A1   Jun. 30, 2016

Related U.S. Application Data

(63) Continuation of application No. 14/260,927, filed on Apr. 24, 2014, now Pat. No. 9,313,619.

(51) Int. Cl.
*H04W 4/029* (2018.01)
*G01C 21/30* (2006.01)
(Continued)

(52) U.S. Cl.
CPC .......... *H04W 4/029* (2018.02); *G01C 21/30* (2013.01); *H04W 4/021* (2013.01); *H04W 4/027* (2013.01)

(58) Field of Classification Search
CPC ..... H04W 4/021; H04W 4/027; H04W 4/028; G01C 21/30
See application file for complete search history.

(56) References Cited

U.S. PATENT DOCUMENTS 4,697,078 A * 9/1987 Randall ................. G01V 5/105
250/256
6,486,831 B1 * 11/2002 Martorana ............. G01S 5/021
342/458

(Continued)

FOREIGN PATENT DOCUMENTS

WO       2013040218 A2     3/2013

OTHER PUBLICATIONS

Chong, et al., "Ranging and Localization by UWB Radio for Indoor LBS," NTT DOCOMO Technical Journal, 2009, pp. 41-48, vol. 11, No. 1, DOCOMO Communication Laboratories USA, Inc., 8 pages.

(Continued)

*Primary Examiner* — Nicholas Kiswanto
(74) *Attorney, Agent, or Firm* — Amin, Tuocy & Watson, LLP

(57) ABSTRACT

Estimation of mobile device presence inside a defined region is facilitated. In one example, a device receives location information representing locations of a mobile device and corresponding time information for the locations of the mobile device. The device determines an estimated path of travel for the mobile device based on the location information and, based on the corresponding time information for the locations of the mobile device, determines whether the estimated path of travel traverses, at a defined time period of interest, a defined region that includes a defined portion.

20 Claims, 14 Drawing Sheets

(51) Int. Cl.
*H04W 4/021* (2018.01)
*H04W 4/02* (2018.01)

(56) References Cited

U.S. PATENT DOCUMENTS

| | | | |
|---|---|---|---|
| 7,312,752 B2 | 12/2007 | Smith et al. | |
| 7,522,099 B2* | 4/2009 | Zhodzishsky | G01C 21/00 |
| | | | 342/357.24 |
| 8,213,957 B2 | 7/2012 | Bull et al. | |
| 8,224,349 B2 | 7/2012 | Meredith et al. | |
| 8,301,765 B2 | 10/2012 | Goodman | |
| 8,326,315 B2 | 12/2012 | Phillips et al. | |
| 8,369,264 B2 | 2/2013 | Brachet et al. | |
| 8,386,620 B2 | 2/2013 | Chatterjee | |
| 8,447,328 B2 | 5/2013 | Austin et al. | |
| 8,471,701 B2 | 6/2013 | Yariv et al. | |
| 8,504,034 B2 | 8/2013 | Miyake et al. | |
| 8,538,393 B1 | 9/2013 | Beyer, Jr. et al. | |
| 8,538,458 B2 | 9/2013 | Haney | |
| 8,570,993 B2 | 10/2013 | Austin et al. | |
| 8,606,260 B2 | 12/2013 | Chatterjee | |
| 8,626,187 B2 | 1/2014 | Grosman et al. | |
| 8,761,799 B2 | 6/2014 | Meredith et al. | |
| 9,237,543 B2* | 1/2016 | Karr | G01S 1/026 |
| 9,529,089 B1* | 12/2016 | Buether | G01S 19/05 |
| 9,733,085 B2* | 8/2017 | Stahlin | G01C 21/32 |
| 2004/0171388 A1 | 9/2004 | Couronne et al. | |
| 2008/0004904 A1 | 1/2008 | Tran | |
| 2010/0274435 A1* | 10/2010 | Kondoh | B60W 40/09 |
| | | | 701/31.4 |
| 2011/0063138 A1 | 3/2011 | Berkobin et al. | |
| 2012/0299724 A1* | 11/2012 | Kuper | G01C 21/165 |
| | | | 340/539.13 |
| 2012/0307645 A1 | 12/2012 | Grosman et al. | |
| 2012/0309376 A1 | 12/2012 | Huang et al. | |
| 2012/0322458 A1* | 12/2012 | Shklarski | H04W 12/02 |
| | | | 455/456.1 |
| 2013/0005362 A1 | 1/2013 | Borghei | |
| 2013/0030876 A1 | 1/2013 | Rinehart et al. | |
| 2013/0091016 A1 | 4/2013 | Shutter | |
| 2013/0178193 A1 | 7/2013 | McNamara et al. | |
| 2013/0210454 A1 | 8/2013 | O'Sullivan et al. | |
| 2013/0225196 A1 | 8/2013 | James et al. | |
| 2013/0244564 A1 | 9/2013 | Hall | |
| 2013/0303195 A1 | 11/2013 | Bahl et al. | |
| 2013/0310053 A1 | 11/2013 | Srivastava et al. | |
| 2013/0324166 A1 | 12/2013 | Mian et al. | |
| 2013/0337829 A1 | 12/2013 | Fix et al. | |
| 2014/0139371 A1* | 5/2014 | Veitsel | G01S 19/43 |
| | | | 342/357.51 |
| 2014/0236482 A1 | 8/2014 | Dorum et al. | |
| 2015/0134245 A1 | 5/2015 | Meredith et al. | |

OTHER PUBLICATIONS

Kupper, et al., "Geofencing and Background Tracking—The Next Features in LBSs," Informatik-Informatik schafft Communities, 2011, Berlin, 14 pages.

Yadav, et al., "Marketing in Computer-Mediated Environments: Research Synthesis and New Directions," Journal of Marketing, 2013, American Marketing Association, 21 pages.

Namiot, et al., "Geofence and Network Proximity," Internet of Things, Smart Spaces, and Next Generation Networking, 2013, Springer Berlin Heidelberg, 6 pages.

Bulusu, et al., "GPS-less low-cost outdoor localization for very small devices," IEEE Personal Communications Magazine, Oct. 2000, pp. 28-34, IEEE, 7 pages.

Office Action dated Jul. 22, 2015 for U.S. Appl. No. 14/260,927, 27 pages.

Douglas, "RMS and RSS in Error Analysis," The Math Forum at NCTM, Ask Dr. Math, 3 pages. Retrieved on Jun. 28, 2018. http://mathforum.org/library/drmath/view/68395.html.

"Root-mean-square deviation," Wikipedia, 4 pages. Retrieved on Jun. 28, 2018. https://en.wikipedia.org/wiki/Root-mean-square_deviation.

* cited by examiner

FACILITATING ESTIMATION OF MOBILE DEVICE PRESENCE INSIDE A DEFINED REGION

CROSS-REFERENCE TO RELATED APPLICATION

This application is a continuation of, and claims priority to, U.S. patent application Ser. No. 14/260,927 (now U.S. Pat. No. 9,313,619), filed Apr. 24, 2014, and entitled "FACILITATING ESTIMATION OF MOBILE DEVICE PRESENCE INSIDE A DEFINED REGION," the entirety of which application is hereby incorporated herein by reference.

TECHNICAL FIELD

The subject disclosure relates generally to information processing, e.g., to facilitating estimation of mobile device presence inside a defined region.

DETAILED DESCRIPTION

Figure 1:
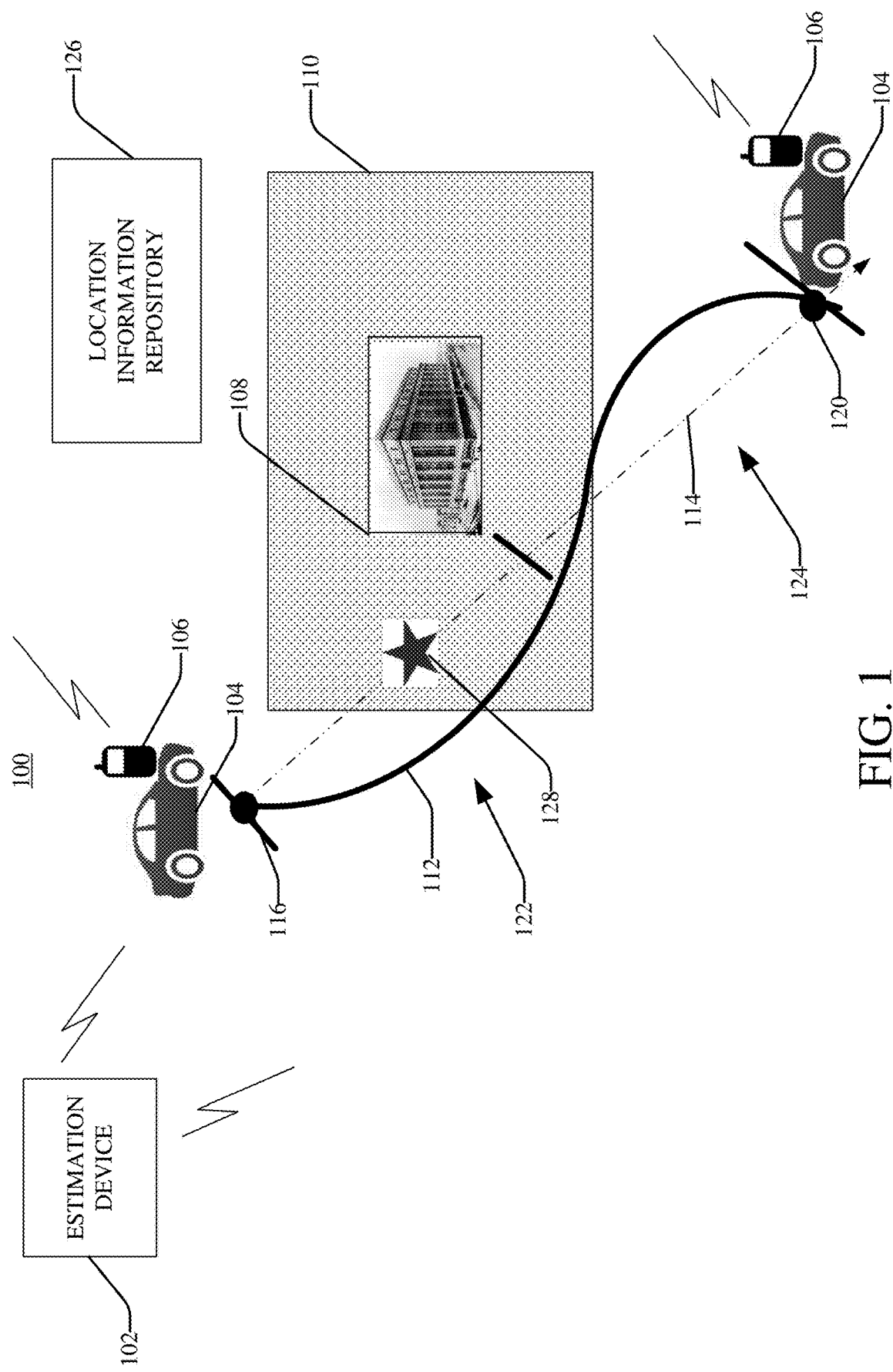
FIGS. 1 and 2 illustrate example block diagrams of a system facilitating a linear estimation method of mobile device presence inside a defined region in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "mobile device," "subscriber," "customer," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the terms "femto" and "femto cell" are used interchangeably, and the terms "macro" and "macro cell" are used interchangeably.

There is high value in mobile location information and this value can increase with accuracy of the mobile location information. Current mobile locating systems provide a variety of methods for locating mobile devices. On one extreme, locating mobile devices employing a global positioning system (GPS) can provide highly-accurate location information on the order of ten meters. One the other extreme, locating mobile devices employing a cell site identification (cellID) system can provide low accuracy location information on the order tens of thousands of meters. However, while the GPS approach is more accurate, GPS information collection can be battery-intensive and thus incompatible with limited mobile battery life. As such, the use of GPS-based collection of location information by continuous reporting from mobile devices is impractical. Accordingly, systems typically have a very low volume of GPS location records. Further, many uses for mobile device location information (e.g., determining whether a mobile device is within a defined region associated with a retail establishment) require a wealth of accurate location records, but highly-accurate location records are generally not available for the aforementioned reasons.

Accordingly, embodiments described herein comprise systems, methods, apparatus and/or computer-readable storage media facilitating estimation of mobile device presence inside a defined region. In one embodiment, a method comprises: receiving, by a device comprising a processor, location information representing locations of a mobile device and corresponding time information for the locations of the mobile device; determining, by the device, an estimated path of travel for the mobile device based on the location information; and based on the corresponding time information for the locations of the mobile device, determining, by the device, whether the estimated path of travel traverses a defined region comprising a defined point of interest at a defined time of interest.

In another embodiment, an apparatus comprises: a processor and a memory that stores executable instructions that, when executed by the processor, facilitate performance of operations. The operations comprise: receiving location information representing locations of a mobile device and corresponding time information for the locations of the mobile device; determining an estimated path of travel for the mobile device based on the location information; and based on the corresponding time information for the locations of the mobile device, determining whether a location on the estimated path of travel is within the defined region within a defined time period of interest, wherein the defined region comprises a defined portion of the defined region of interest.

In another embodiment, a computer-readable storage device is provided. The computer-readable storage device stores computer-executable instructions that, in response to execution, cause a first device comprising a processor to perform operations. The operations comprise: receiving location information representing locations of a mobile device and corresponding time information for the locations of the mobile device; determining an estimated path of travel for the mobile device based on the location information; and based on the corresponding time information for the locations of the mobile device, determining whether the estimated path of travel traverses a defined region comprising a defined spot of interest at least approximately at a defined time of interest.

One or more embodiments can advantageously facilitate determination of whether a mobile device has traveled through, or is located within, a defined region, and corresponding confidence/reliability information as to whether the determination is likely accurate. The embodiments described herein advantageously make such determination notwithstanding no location records obtained by the systems, apparatus, or used in the methods, locate the mobile device within the defined region.

One or more embodiments can also be employed in combination with transmission sources to provide autonomous vehicle transport in instances in which the density of points of interest to which the autonomous vehicle transport is scheduled to travel is higher than a particular threshold value. Accordingly, embodiments described herein can be employed in environments having a high density of points of interest associated with the autonomous vehicle transport.

Figure 2:
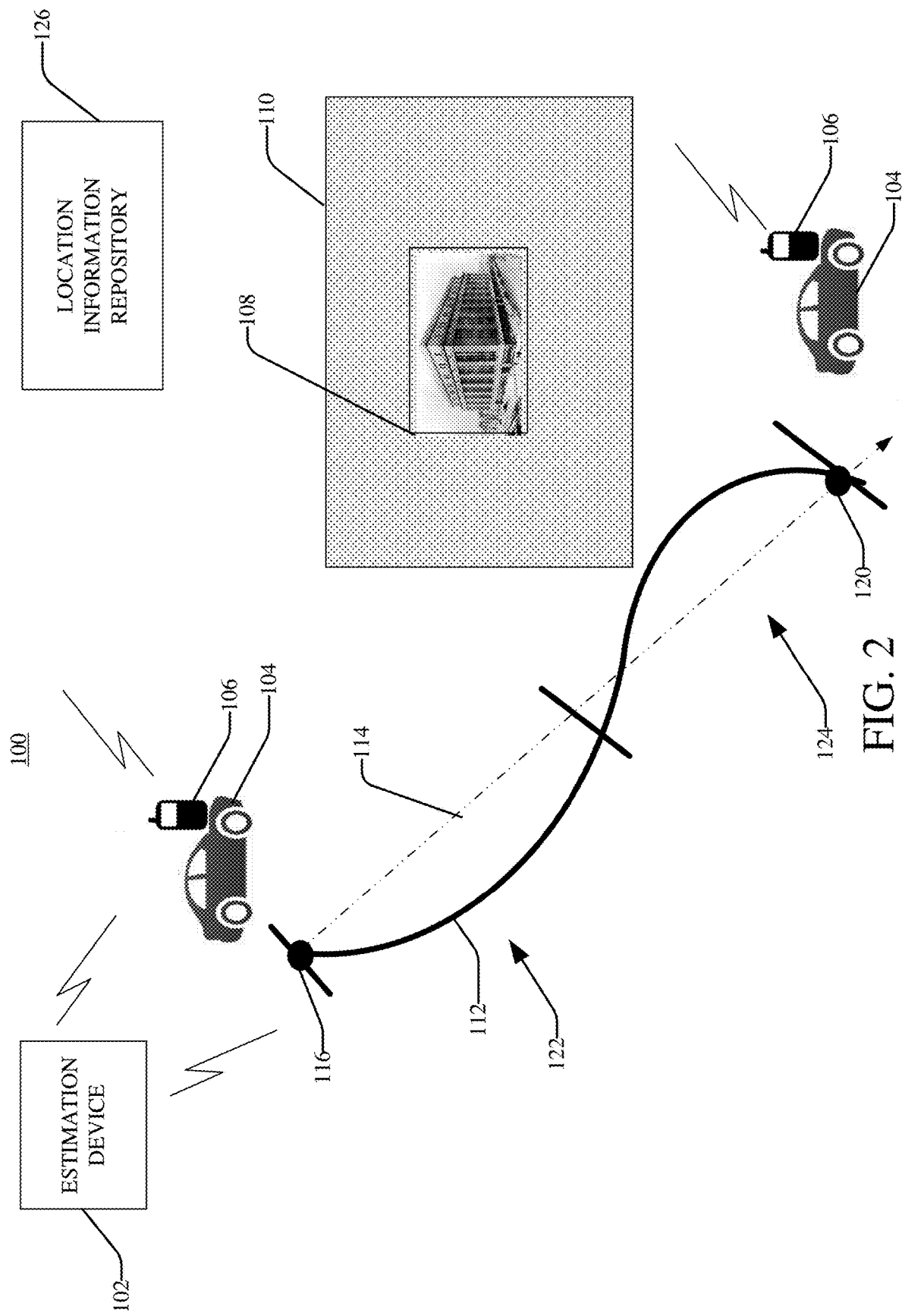

Turning now to the drawings, FIGS. 1 and 2 illustrate example block diagrams of a system facilitating a linear estimation method of mobile device presence inside a defined region in accordance with one or more embodiments described herein. FIG. 1 illustrates an embodiment in which the mobile device is determined to have traveled through a defined region including a point of interest while FIG. 2 illustrates an embodiment in which the mobile device is determined to not have traveled through the defined region. Accordingly, embodiments such as those described can advantageously provide useful information to owners/administrators/managers of business entities that are represented by the point of interest.

System 100 can comprise estimation device 102, location information repository 126 and mobile device 106 located at mobile object 104. In various embodiments, one or more of estimation device 102, location information repository 126 and mobile device 106 located at mobile object 104 can be electrically and/or communicatively coupled to one another to perform one or more functions of system 100 and/or to facilitate performance of one or more functions by estimation device 102.

Estimation device 102 can receive or access location information for mobile device 106 and perform linear estimation and/or roadway-based estimation of a path of travel for mobile device 106. The location information can be received from or accessed at location information repository 126 in some embodiments. In other embodiments, the location information can be received from mobile device 106. In various embodiments, the location information can be or include Network Event Locating System (NELOS) location information, global positioning system (GPS) information and/or information indicative of a Wi-Fi hotspot in a defined proximity of mobile device 106. Any information indicative of a location of mobile device 106 (e.g., whether employing longitude and latitude information, nearby points of interest information, roadway information or the like) can be employed in the embodiments described herein.

Point of interest 108 is located within region 110. In various embodiments, point of interest 108 can be any number of different types of establishments including, but not limited to, retail establishments (e.g., coffee shop, grocery store, shoe store), museums (e.g., High Museum of Art, Fernbank Museum of Natural History), sporting events (e.g., Atlanta Braves stadium) or other public events (e.g., fairs).

In various embodiments, as described herein, estimation device 102 can estimate path of travel 114 based on location information indicating geographical locations/points 116, 120, neither of which are located within region 110. Estimation device 102 can determine a quality factor indicative of the error associated with the location information. If the quality factor indicates error equal to or greater than a defined threshold, the location information is discarded. If the quality factor indicates error less than the defined threshold, estimation device 102 employs linear estimation or roadway-based estimation methods to determine whether mobile device 102 traveled through region 110 at or within a defined time.

Figure 3:
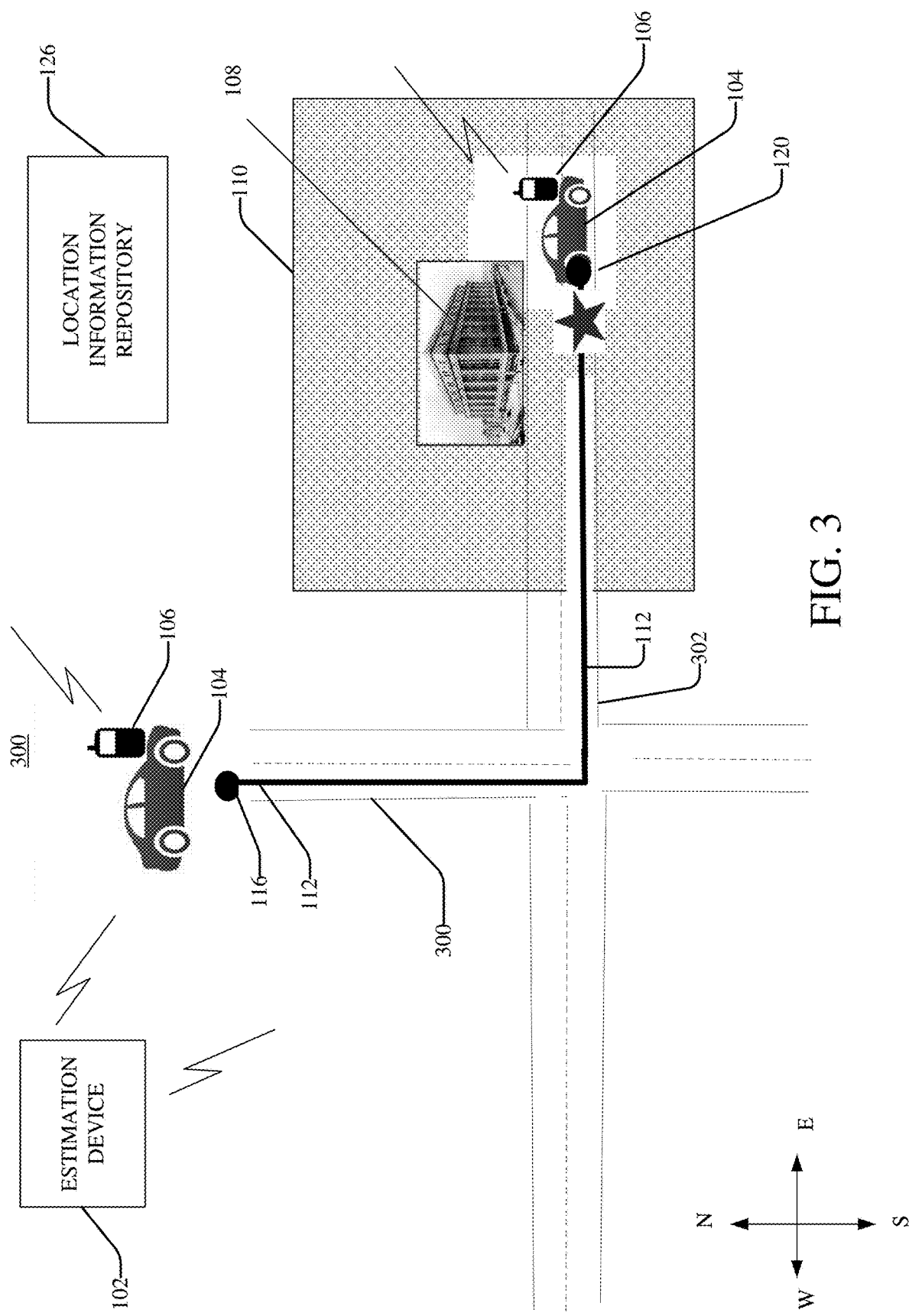
FIGS. 3 and 4 illustrate example block diagrams of a system facilitating roadway-based estimation of mobile device presence inside a defined region in accordance with one or more embodiments described herein.
Figure 4:
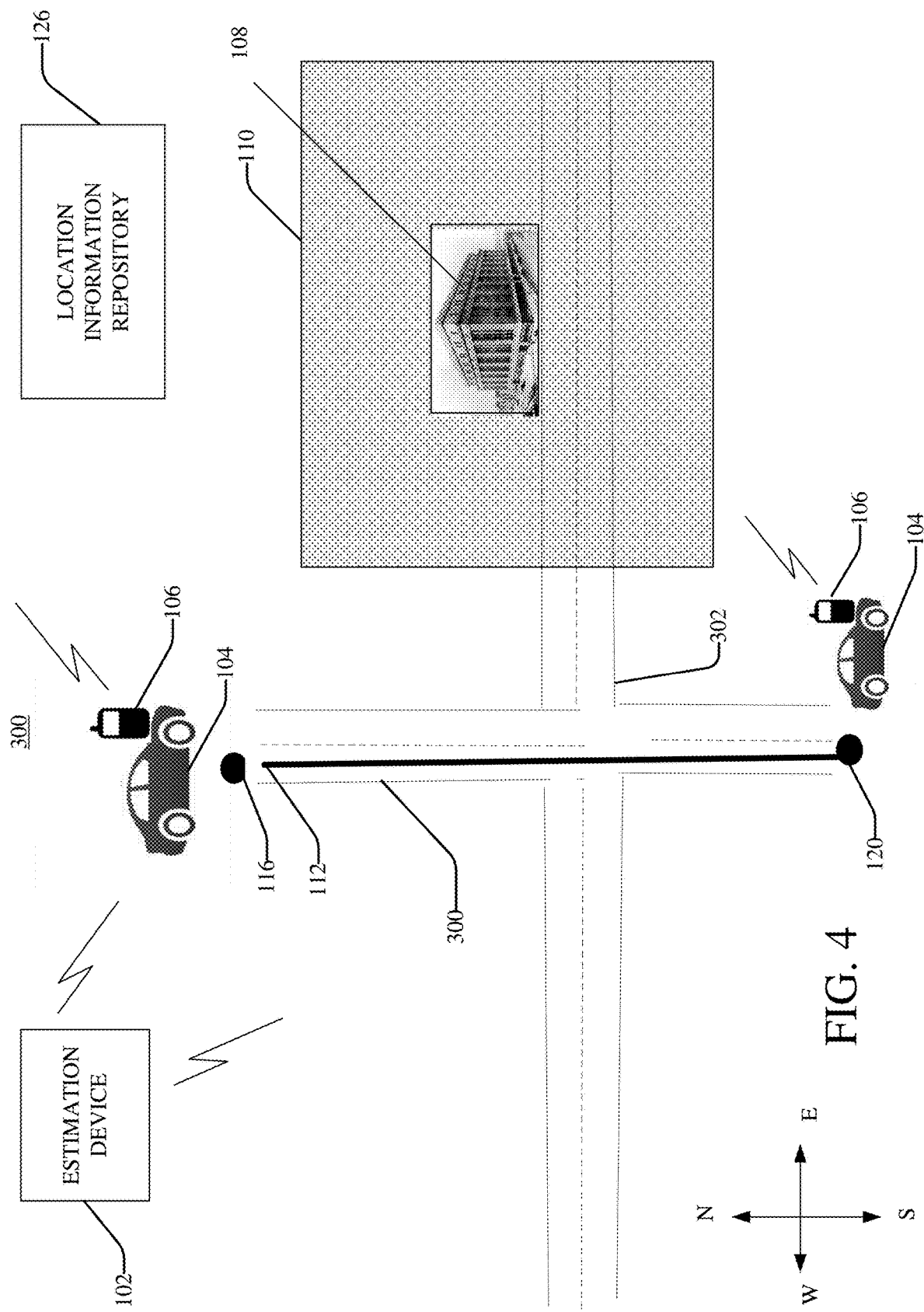
Figure 5:
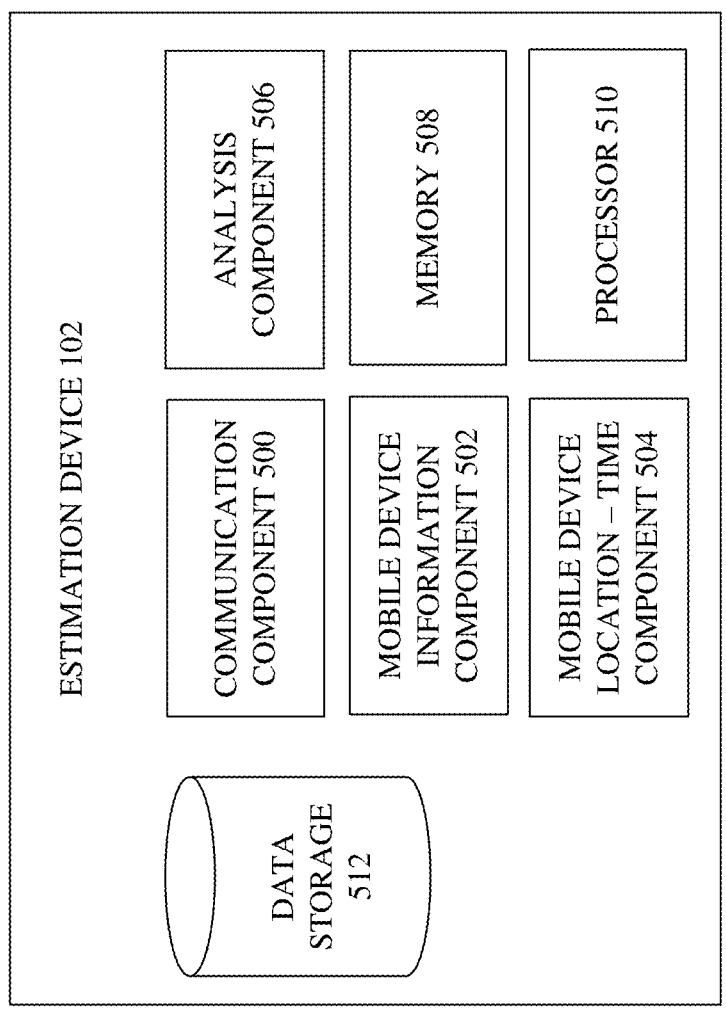
FIG. 5 illustrates an example block diagram of an estimation device that can facilitate estimation of presence inside a defined region in accordance with one or more embodiments described herein.
Figure 6:
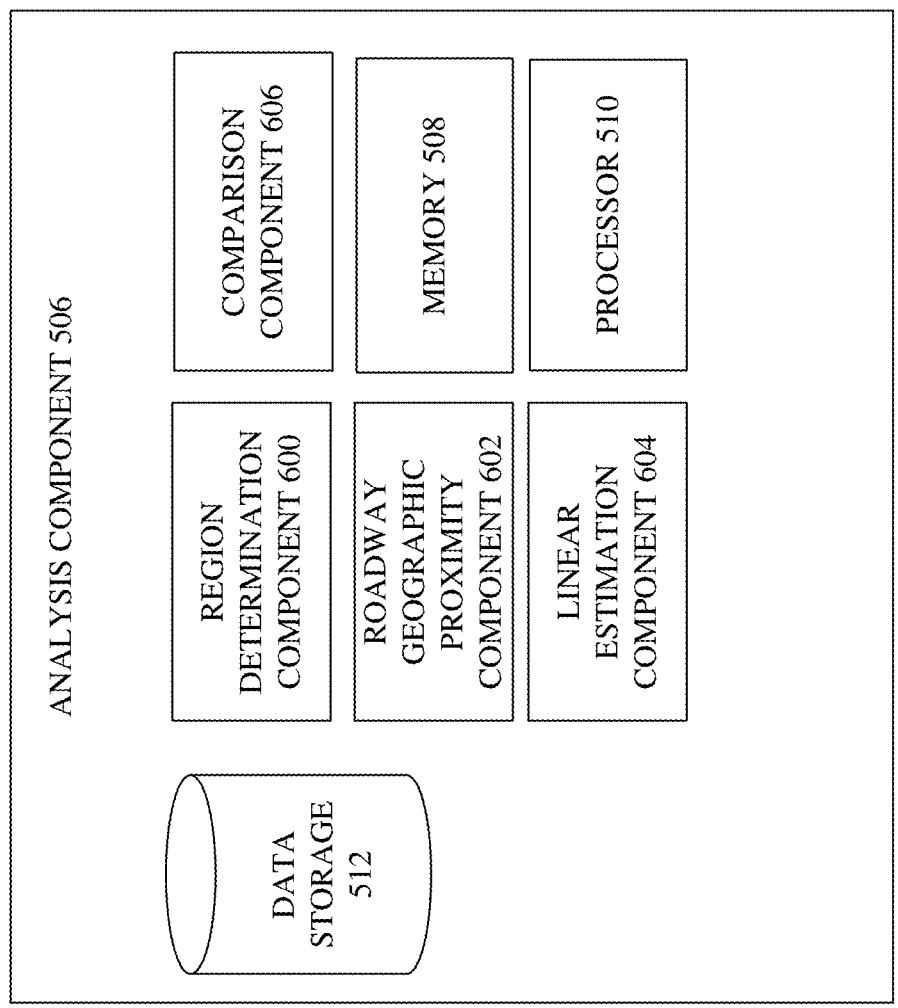
FIG. 6 illustrates an example block diagram of an analysis component of the estimation device of FIG. 5 in accordance with one or more embodiments described herein.

The structure and/or functionality of estimation device 102 will now be described in greater detail with reference to FIGS. 1-6. FIGS. 1 and 2 illustrate a block diagram as described above. FIGS. 3 and 4 illustrate example block diagrams of a system facilitating roadway-based estimation of mobile device presence inside a defined region in accordance with one or more embodiments described herein. FIG. 5 illustrates an example block diagram of an estimation device that can facilitate estimation of presence inside a defined region in accordance with one or more embodiments described herein. FIG. 6 illustrates an example block diagram of an analysis component of the estimation device of FIG. 5 in accordance with one or more embodiments described herein.

Turning now to FIG. 5, estimation device 102 can comprise communication component 500, mobile device information component 502, mobile device location-time (MDLT) component 504, analysis component 506, memory 508, processor 510 and/or data storage 512. In various embodiments, one or more of communication component 500, mobile device information component 502, MDLT component 504, analysis component 506, memory 508, processor 510 and/or data storage 512 can be electrically and/or communicatively coupled to one another to perform one or more functions of estimation device 102. Repetitive description of like elements employed in respective embodiments of systems and/or apparatus described herein are omitted for sake of brevity.

Communication component 500 can transmit, receive and/or access information from and/or at estimation device 102. For example, with reference in FIGS. 1, 2 and 5, communication component 500 of estimation device 102 can receive information indicative of one or more location records for mobile device 106. For example, a first location record received and/or accessed by communication component 500 can indicate a geographic location corresponding to point 116 at a first defined time and a second location record can indicate a geographic location corresponding to point 120 at a second defined time.

In some embodiments, communication component 500 can receive the location records from mobile device 106. For example, when a GPS receiver (not shown) located at mobile device 106 is powered on/activated, the GPS receiver can receive location information for mobile device 106.

Location information repository 126 and/or mobile device 106 can transmit the location information to estimation device 102 and/or serve as a source for access of location information by estimation device 102. In some embodiments, a location reporting system that determines one or more locations of mobile device 106 can identify and report the location information to estimation device 102 (and/or can be a source for access of the location information by estimation device 102).

Communication component 500 can transmit information indicative of whether mobile device 106 traveled through region 110 at a particular defined time of interest. For example, in some embodiments, communication component 500 can transmit information indicative of whether mobile device 106 traveled through region 110 at a particular defined time to a third-party associated with the point of interest 108.

As shown in FIG. 5, estimation device 102 can also comprise a mobile device information component 502 and MDLT component 504. Mobile device information component 502 can determine the location indicated by the location record received and/or accessed by communication component 500. For example, mobile device information component 502 can determine that a first location record indicates that mobile device 106 was located at point 116 at time 0:10 and that a second location record indicates that mobile device 106 was located at point 120 at time 0:50. Accordingly, mobile device traveled along a path (e.g., path 112), neither of which has points located within region 110. FIGS. 1 and 2 show path 112 as an example path of possible travel by mobile device 106 shown merely for explanatory/illustration purposes; however, estimation device 102 estimates path of travel 114 without the benefit of knowing actual path 112 and knowing only location information for path 112 at points 116, 120.

In some embodiments, communication component 500 receives and/or accesses at least two location records describing travel of mobile device 106. In other embodiments, communication component 500 receives and/or accesses a single location record for mobile device 106, and MDLT component 504 can determines another location record with which to pair the received/accessed location record. For example, MDLT component 504 can pair the received/accessed location record with another location record (previously-stored or otherwise received/accessed by communication component 500) that is adjacent in time with the time associated with the received/accessed location record.

Estimation device 102 can also comprise analysis component 506. Analysis component will be described in greater detail with reference to FIG. 6. One or more of the structure and/or functionality of analysis component 506 will be described in greater detail with reference to FIG. 6.

Analysis component 506 can comprise region determination component 600, roadway geographic proximity component 602, linear estimation component 604, comparison component 606, memory 508, processor 510 and/or data storage 512. One or more of region determination component 600, roadway geographic proximity component 602, linear estimation component 604, comparison component 606, memory 508, processor 510 and/or data storage 512 can be electrically and/or communicatively coupled to one another to perform one or more functions of analysis component 506. Repetitive description of like elements employed in respective embodiments of systems and/or apparatus described herein are omitted for sake of brevity.

With reference to FIGS. 1, 2, 5 and 6, region determination component 600 can determine boundaries of point of interest 108 and/or a defined region (e.g., region 110) surrounding one or more portions of point of interest 108. In some embodiments, estimation device 102 need not determine boundaries for point of interest 108 and/or defined region 110. Instead, in some embodiments, estimation device 102 can receive and/or access such information from a location remote from estimation device 102.

Analysis component 506 can make a decision to pursue roadway-based estimation employing roadway geographic proximity component 602 or linear estimation employing linear estimation component 604. If the roadway-based estimation approach is available, such approach is employed for determining a path of travel between the pair of location records and determining whether a point on the path of travel traveled through region 110 at a defined time. In some embodiments, if the roadway-based estimation approach is not available, the linear estimation approach can be employed. In other embodiments, either of the approaches can be employed in any order of preference as determined by the system designer and/or accuracy levels desired for estimation of whether the mobile device likely traveled through the defined region at a defined time of interest.

The linear estimation approach will be described first with reference to FIGS. 1, 2, 5 and 6. The roadway-based approach will also be described, but with reference to FIGS. 3, 4, 5 and 6. While FIGS. 1 and 2 illustrate examples of systems facilitating linear estimation of mobile device presence inside a defined region and employ linear estimation, FIGS. 3 and 4 illustrate example block diagrams of a system facilitating roadway-based estimation of mobile device presence inside a defined region in accordance with one or more embodiments described herein and employ roadway geographic proximity-based estimation.

Linear estimation component 604 can determine the path of travel (e.g., path of travel 114) employing points 116, 120 and using a linear estimation method. For example, linear estimation component can interpolate and determine a virtual line/route region between the two locations indicated by the two location records. In some embodiments, the virtual line/route region is a substantially straight line having end points, or points on the line, coinciding with the locations dictated by the location records.

As such, in some embodiments, linear estimation component 604 can generate one or more synthetic location records including information about one or more estimated locations between points 116, 120. A synthetic location record can be a location record about estimated location information for mobile device 106 that is generated by estimation device 102 based on actual location records received/accessed about travel of mobile device 106. The one or more estimated locations of the synthetic location record can be based on performing interpolation between the points 116 and 120, and selecting one or more points along the interpolated line. The interpolated line can be considered and/or assigned as a path of travel (e.g., path of travel 114).

In some embodiments, linear estimation component 604 can also determine a time/timestamp corresponding to, or as part of, the synthetic location record generated by linear estimation component 604. Linear estimation component 604 can estimate the time at which mobile device 106 was located at point 128 within region 110 based on the actual time for the timestamps of the individual location records for points 116 and 120, and the interpolated time for the timestamps of a synthetic location record created by linear estimation component 604. For example, linear estimation component 604 can interpolate between the time at which mobile device 106 was located at point 116 and the time at which mobile device 106 was located at point 120 to determine an interpolated time at which mobile device 106 was located at the location indicated by the synthetic location record.

In some embodiments, linear estimation component 604 can incorporate posted, known and/or or predicted traffic speeds that intersect with path of travel 114 to determine time corresponding to, or located within, the synthetic location record. For example, if there is a construction or other roadway delay that reduces traffic speed, linear estimation component 604 can take into account the reduced traffic speed and assume mobile device 106 is traveling at such speed or less to determine the time corresponding to, or included as part of, the synthetic location record.

In some embodiments, linear estimation component 604 can estimate the speed of mobile device 106 as the distance between the two locations indicated by the location records, divided by time. For example, if the distance between points 116 and 120 is 900 meters (m), and the amount of time that passed between the point 116 location and the point 120 location was 50 seconds (s), the speed of mobile device can be estimated as 900 m/50 s=18 m/s.

Linear estimation component 604 can also utilize location errors associated with one or more (or each) of the location records to estimate one or more reliability or confidence measures regarding determinations about the speed of mobile device 106 at any particular location. The estimated reliability or confidence measure can be factored into a total confidence measure regarding the determination as to whether mobile device 106 was within region 110 at a defined time.

By way of example, but not limitation, in one embodiment, region 110 is 100 meters (m)×100 meters square and estimation device 102 receives or accesses a first location record for mobile device 106 that indicates mobile device 106 is located 500 m west of region 110, and receives or accesses a second location record for mobile device 106 that indicates that mobile device 106 is 400 m east of region 110. In this example, linear estimation component 604 can assign the location error estimates for these two location records are 100 m and 200 m, respectively, and the time between the two locations can be determined to be 50 seconds. Linear estimation component 604 can then estimate the speed of mobile device 106 as the distance between the two locations indicated by the location records, divided by time, or 900 m/50 seconds=18 m/s.

In some embodiments, linear estimation component 604 can estimate a standard deviation for the value determined to be the speed of mobile device 106 (e.g., a standard deviation for the claim that mobile device 106 was traveling at 18 m/s). In some embodiments, the standard deviation can be estimated to be equal to half of the square root of the sum of squares of the errors for the location records divided by time separation between the first and second locations. In this case, the standard deviation can equal 0.5*Square Root($100^2+200^2$)/50=2.236 m/s.

Comparison component 606 of analysis component 506 can determine whether the standard deviation is less than a particular threshold. In some embodiments, linear estimation component 604 can employ standard deviation of 25 percent as a threshold value.

In some embodiments, if comparison component 606 determines that the standard deviation is less than the particular threshold, and is thus a sufficiently small proportion of the speed, then compare component 606 can output a signal to linear estimation device 604 indicating that linear estimation component 604 can continue with employing the speed estimate for use in the embodiments described herein.

Otherwise, in some embodiments, linear estimation component 604 can discontinue the method and determine that the location records received/accessed and associated with points 116, 120 are too inaccurate to formulate a determination regarding speed of mobile device 106. For example, in one embodiment, if the standard deviation is greater than the standard deviation threshold, the errors in the location records are too large relative to the distance traveled and the time of travel to make reasonable claims about the speed of the mobile device 106.

In this embodiment, comparison component 606 can compare the standard deviation to the standard deviation threshold and determine that the errors in the location records are too large. As such, in some embodiments, linear estimation component 604 can find the maximum longitude and latitude for the boundary of region 110 and take the greater of these two as a reference distance that estimation device can divide by a number of desired segments for path of travel 114. For example, in some embodiments, path of travel can be divided into two segments while in other embodiments, for example, path of travel can be divided into five segments. These numbers of segments are mere examples, but are used to indicate possible segment lengths for the estimated path of travel 114 joining the locations indicated by the first location record and the second location record. In this example, the maximum length is 100 m so the reference length is 20 m. Linear estimation component 604 can divide the length of estimated path of travel 114 connecting the two locations indicated by the first and second location records into 20 m segments and determine the center of each of these resultant segments, for example.

Generally, linear estimation component 604 can determine one or more segments along estimated path of travel 114. In some embodiments, as described, linear estimation component 604 determines the one or more segments by dividing path of travel 114 into two or more segments of substantially equal length. However, in other embodiments, linear estimation component 604 can separate path of travel 114 into segments based on any other approach determined by linear estimation component and which can change from time to time. As an example, linear estimation component 604 can divide path of travel 114 into two equal segments (e.g., segments 122, 124 of FIG. 1).

Linear estimation component 604 can evaluate the locations of the centers of segments 122, 124 to determine whether (or the probability that) estimated path of travel 114 collided within, or was located within, region 110. For example, if a center of segment 122 or a center of segment 124 is located at a particular latitude and longitude, linear estimation component 604 can compare the latitude and longitude with the latitude and longitude boundaries for region 110 to determine whether the center for the segment is within the boundaries for region 110. As shown in FIG. 1, center of segment 122 is located at point 128, which is located within boundaries of region 110. As such, in some embodiments, linear estimation component 604 can determine that mobile device 106 likely traveled through region 110. Linear estimation component 604 can then determine a likely time that mobile device 106 was located at point 128 to determine whether mobile device 106 was within region 110 at a defined time. In some embodiments, linear estimation component 604 can determine that region 110 has been included in path of travel 114 and determine the integer value of the segment (e.g., 1 (for segment 122), 2 (for segment 124)) within region 110 to achieve an estimate of the time at which mobile device 106 was within region 110.

Turning back to FIG. 5, memory 508 can be a computer-readable storage medium storing computer-executable instructions and/or information for performing the functions described herein with reference to estimation device 102 or any component of estimation device (e.g., analysis component 506, roadway geographic proximity component 602, linear estimation component 604, comparison component 606 or the like). For example, memory 508 can store computer-executable instructions that can be executed by processor 510 to perform communication, linear estimation, roadway-based estimation, determination of confidence and/or reliability of location information, determination of quality factor, evaluation, decision-making or other types of functions executed by estimation device or any component of estimation device. Processor 510 can perform one or more of the functions described herein with reference to evaluation component 102 or any components of estimation device 102. For example, processor 510 can estimate a path of travel of a mobile device, determine whether the path of travel intersects with a defined region that includes a point of interest and/or determine whether to employ linear estimation or roadway-based estimation or the like.

Figure 7:
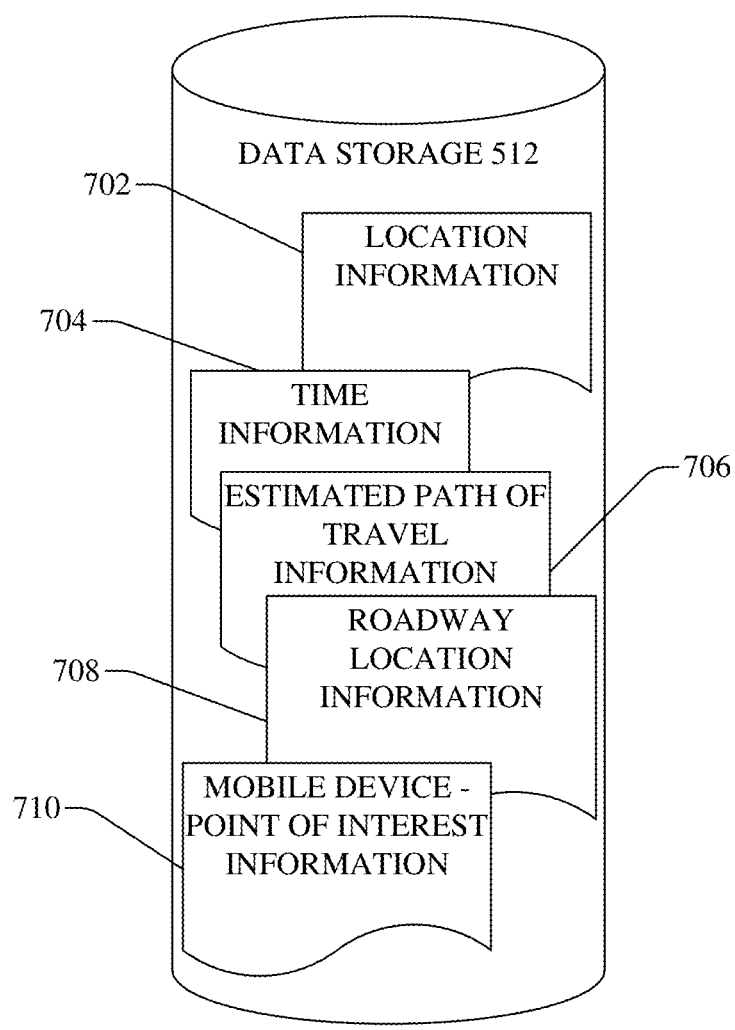
FIG. 7 illustrates an example block diagram of data storage of the estimation device of FIG. 5 in accordance with one or more embodiments described herein.

Data storage 512 can be described in greater detail with reference to FIG. 7. FIG. 7 illustrates an example block diagram of data storage of the estimation device of FIG. 5 in accordance with one or more embodiments described herein. As shown, data storage 512 can be configured to store information accessed by, received by and/or processed by estimation device 102 (or any component of estimation device 102). For example, data storage 512 can store location information 702 (e.g., one or more location records for a mobile device, information regarding whether a location record is a synthetic record), time information 704 (e.g., time associated with a particular location indicated by the location record), estimated path of travel information 706 (e.g., longitude and latitude of one or more points on an estimated path of travel, street names or other identifiers of location associated with an estimated path of travel), roadway location information (e.g., maps or other roadway information to determine whether mobile device is within a defined geographic proximity of a particular defined roadway, quality factor equation information) and/or mobile device region of interest information (e.g., boundary and/or other location information about a point of interest or a region in which the point of interest is located).

Turning now to FIGS. 3, 4, 5 and 6, in some embodiments, analysis component 506 can also comprise roadway geographic proximity component 602. Roadway geographic proximity (RGP) component 602 can estimate the path of travel (e.g., path of travel 300 then path of travel 302) of mobile device 106 employing points 116, 120 and using a roadway-based estimation method.

Another embodiment of a process facilitating estimation of mobile device presence inside a defined region is as follows. The embodiment described provides further detail regarding the roadway-based estimation approach.

A location record is processed and/or accessed by estimation device 102. Estimation device 102 determines whether the location record is a synthetic record. If the location record is not a synthetic record (and is therefore a record of an actual location to which mobile device 106 traveled and/or was generated by mobile device 106 or a location/positioning system (e.g., NELOS) that tracks location of mobile device 106), estimation device 102 will consider the location record.

Estimation device 102 pairs the location record associated with a first timestamp with another location record at an adjacent time stamp to obtain two location records that are paired up to be sequential in time with one another. In some embodiments, estimation device 102 can determine and/or apply maximum time separation, $\Delta T$, and the maximum distance separation, $\Delta D$, between the two locations for the location records. For example, in some embodiments, the maximum practical distance between point 116 and point 120 can be based on average road spacing and/or average base station spacing. The maximum distance and a maximum time to travel the maximum distance can be employed as a filter for points 116, 120. Once the maximum distance and maximum time is determined, estimation device 102 can create path of travel 114 and a determination can then be made as to whether mobile device 106 was within region 110 at any time.

These maximum values can be changed from time to time to indicate different values for maximum time separation and/or for maximum distance separation. In some embodiments, the maximum distance is 1.25 kilometers and the maximum time separation is 60 seconds.

Estimation device 102 can also compute the quality factor, which is a function of the error of the location records. In one embodiment, the quality factor is computed as quality factor=square root[(error of location record 1)$^2$+ (error of location record 2)$^2$]/$\Delta T$. If the quality factor is greater than a defined value (e.g., 0.3), the location information is discarded.

For example, the first location record of the pair can be a GPS location record with error 15 m (which can be a small error). The second location record can have error of 200 m (which can be a large error). The quality factor can be defined as such to evaluate the overall error of using these two location records to determine whether a claim can be made regarding whether the mobile device 106 was within region 110 at a particular time with the requisite level of confidence.

If the errors are too large, the quality factor may be too large. For example, a first location record indicating a first location and a second location record indicating a second location can be shown; however, in actuality, because of imprecision, the positions really should be represented as large circles instead of points (which is the case when error is 0 m). The worse the error, the larger the circle. Accordingly, of the two location records that form the pair, the larger the error for the location information, the larger the circle for each location record.

The quality factor allows estimation device 102 to claim that size of these circles is sufficiently small given distance traveling $\Delta D$ to be able to claim with some confidence that mobile device 106 traveled through region 110. If the error is too big, there is less ability to say with a particular confidence level that mobile device 106 traveled through region 110 because mobile device 106 can be located anywhere within the circle represented by the location of the location record and corresponding error in the location record.

If the quality factor satisfies a particular condition (e.g., quality factor less than or substantially equal to 0.3), the roadway-based estimation approach can be employed instead of the linear estimation approach described with reference to linear estimation component 604. To perform the roadway-based estimation approach, RGP component 602 of estimation device 102, associates mobile device 106 to the nearest road (for each location represented by a location record) and separates the road into one or more segments.

To perform this roadway-based estimation approach, RGP component 602 determines whether there is a roadway within a defined geographic proximity of the points associated with location records. For example, with reference to FIG. 3, RGP component 602 determines that roadway 300 is within an acceptable defined geographic proximity of point 116 and roadway 302 is within an acceptable defined geographic proximity of point 120. With reference to FIG. 4, RGP component 602 determines that roadway 300 is within an acceptable defined geographic proximity of points 116 and 120.

RGP component 602 can generate synthetic location records for one or more locations on roadways 300 and 302 instead of (as in the case of linear estimation-based methods), generating a synthetic location record comprised of only a straight line between points 116, 120 irrespective of actual roadways on which mobile device 106 may have traveled.

As with the linear estimation-based approach, RGP component 602 can separate the roadway segments (e.g., roadway 300 is one segment and roadway 302 is another segment for FIG. 3; roadway 300 is the segment for FIG. 4) and determine centers of those segments. As with the linear estimation-based approach, RGP component 602 can determine the manner of segmentation and the number of segments based on any number of approaches. RGP component 602 can also evaluate error of the location records and corresponding quality factor, estimate speed and/or standard deviation with regard to speed, compare speed to standard deviation values, determine/apply maximum distance values to the location records and/or determine/apply maximum time separation values to the location records as described with reference to linear estimation-based approaches.

As shown in FIG. 3, roadway 302 goes through region 110, which includes point of interest 108. Accordingly, for the scenario of FIG. 3, RGP component 602 can generate a signal indicating that mobile device 102 traveled through region 110. For the scenario of FIG. 4, RGP component 602 can generate a signal indicating that mobile device 102 did not travel through region 110.

In some embodiments, if the roadway-based estimation approach is not available because the location record identifies a point that is too far from the road or because the road is not in the database accessed by RGP component 602, RGP component 602 can employ the linear-based estimation approach.

Figure 8A:
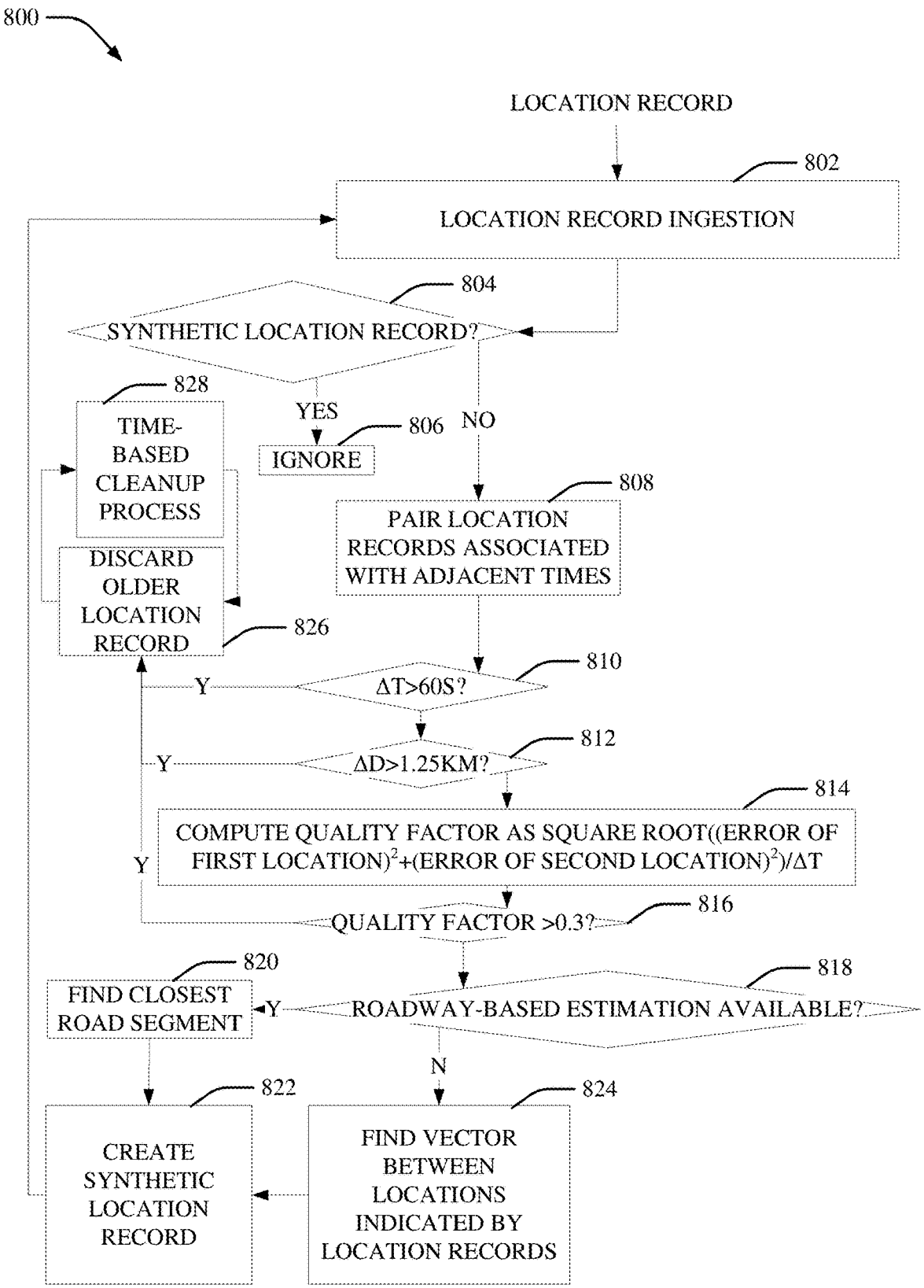
FIGS. 8A, 8B, 9A, 9B, 9C and 10 illustrate example flowcharts of methods that facilitate estimation of presence inside a defined region in accordance with one or more embodiments described herein.

FIGS. 8A, 8B, 9A, 9B, 9C and 10 illustrate example flowcharts of methods that facilitate estimation of presence inside a defined region in accordance with one or more embodiments described herein. Turning first to FIG. 8A, at 802, method 800 can comprise receiving location information and ingesting the location record (or ingesting the location information). As used herein, the term "location record" and "location information" are used interchangeably to represent information that comprises information location of a mobile device.

At 804, method 800 can comprise determining whether the location record is a synthetic location record. At 806, method 800 can comprise ignoring the location record (and taking no further action in method 800) if the location record is a synthetic record. At 808, method 800 can comprise pairing a second location record with the received location record based on determining that the second location record is associated with a time that is adjacent the time associated with the received location record. As such, the pair indicate a first location and a second location adjacent one another in location and time.

At 810, method 800 can comprise determining whether a maximum time separation has been exceeded between the first time and the second time for the respective first and second locations. In the embodiment shown, the maximum time separation is 60 seconds. In other embodiments, any number of maximum time separations can be determined and employed. If the maximum time separation has been exceeded, the location record is discarded (as shown at 826); a time-based clean-up process for permanent removal of the location record is employed over time (as shown at 828).

At 812, method 800 can comprise determining whether a maximum distance separation has been exceeded between the first location and the second location. In the embodiment shown, the maximum distance separation is 1.25 km. In other embodiments, any number of maximum distance separations can be determined and employed. If the maximum distance separation has been exceeded, the location record is discarded (as shown at 826); a time-based clean-up process for permanent removal of the location record is employed over time (as shown at 828).

If neither the maximum time separation nor the maximum distance separation has been exceeded, method 800 continues at 814. At 814, method 800 comprises computing a quality factor for the pair of location records. In one embodiment, the quality factor can equal the square root((error of first location record)$^2$+(error of second location record)$^2$)/ maximum time separation.

At 816, method 800 can comprise determining whether the quality factor exceeds a defined threshold value. In the embodiment shown, the quality factor is 0.3. In other embodiments, other values for the quality factor are possible and the value can change from time to time.

If the quality factor exceeds the value, the location record is discarded (as shown at 826); a time-based clean-up process for permanent removal of the location record is employed over time (as shown at 828).

If the quality factor does not exceed the value, at 818, method 800 can comprise determining whether the roadway-based estimation (e.g., snap to roadway approach) is available. If the locations indicated by the location records are within a defined geographic proximity of defined roadways, the roadway-based estimation approach is available for determining a path of travel between the pair of location records and determining whether the path of travel collided with (was located within) a defined region at a defined time.

If roadway-based estimation is available, at 820, method 800 comprises finding a closest road segment to a location of the mobile device. At 822, a synthetic location record is created. If the roadway-based estimation is not available, at 824, method 800 comprises finding a vector/route region between locations indicated by the pair of location records. The vector/route region can be a virtual line or route between the locations. At 822, a synthetic location record is created. The process can repeat at 802 of method 800.

Figure 8B:
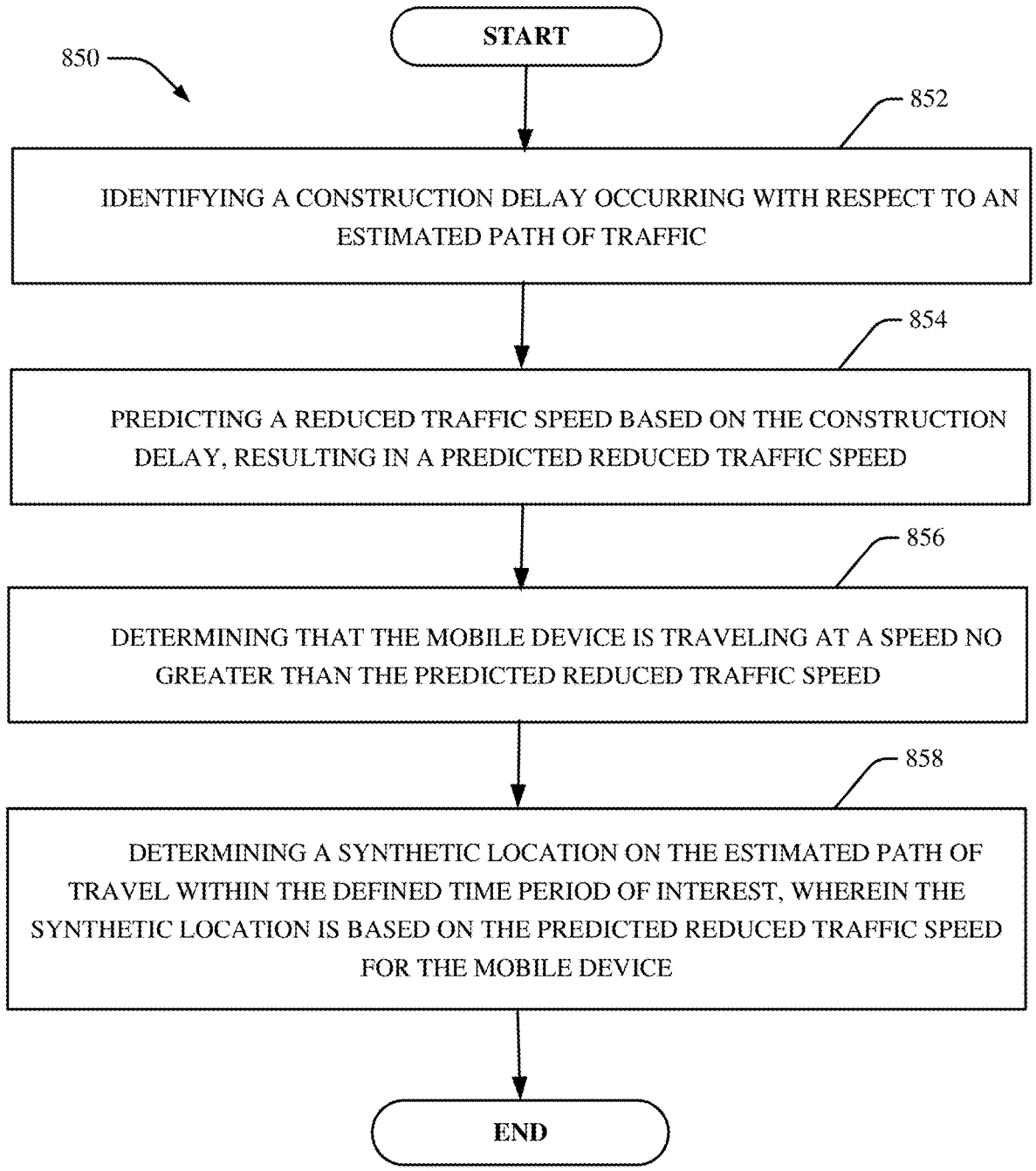

Turning now to FIG. 8B, at 852, optional operations 850 can comprise identifying a construction delay occurring with respect to an estimated path of traffic. At 854, operations 850 can comprise predicting a reduced traffic speed based on the constructions delay, resulting in a predicted reduced traffic speed. At 856, operations 850 can comprise determining that the mobile device is traveling at a speed no greater than the predicted reduced traffic speed. At 858, operations 850 can comprise determining a synthetic location on the estimated path of travel within the defined time period of interest, wherein the synthetic location is based on the predicted reduced traffic speed for the mobile device.

Figure 9A:
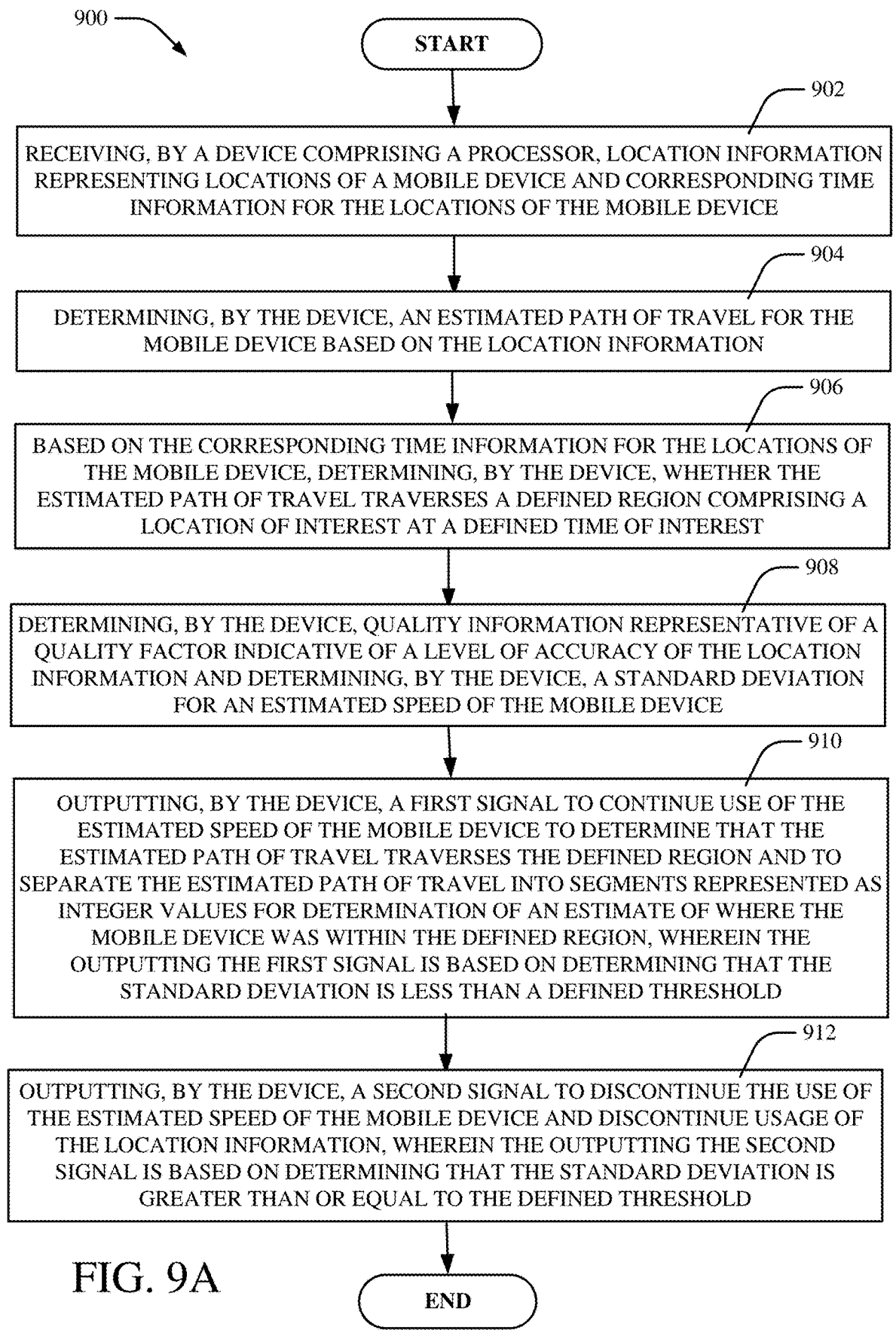

Turning now to FIG. 9A, at 902, method 900 can comprise receiving, by a device including a processor, location information representing locations of a mobile device and corresponding time information for the locations of the mobile device. At 904, method 900 can comprise determining, by the device, an estimated path of travel for the mobile device based on the location information. At 906, method 900 can comprise based on the corresponding time information for the locations of the mobile device, determining, by the device, whether the estimated path of travel traverses a defined region comprising a defined point of interest at a defined time of interest. At 908, method 900 can comprise determining, by the device, quality information representative of a quality factor indicative of a level of accuracy of the location information and determining, by device, a standard deviation for an estimated speed of the mobile device. At 910, method 900 can comprise outputting, by the device, a first signal to continue use of the estimated speed of the mobile device to determine the estimated path of travel traverses the defined region and to separate the estimated path of travel into segments represented as integer values for determination of an estimate of where the mobile device was within the defined region, wherein the outputting the first signal is based on determining that the standard deviation is less than a defined threshold. At 912, method 900 can comprise outputting, by the device, a second signal to discontinue the use of estimated speed of the mobile device and discontinue usage of location information, wherein the outputting the second signal is based on determining that the standard deviation is greater than or equal to the defined threshold.

Figure 9B:
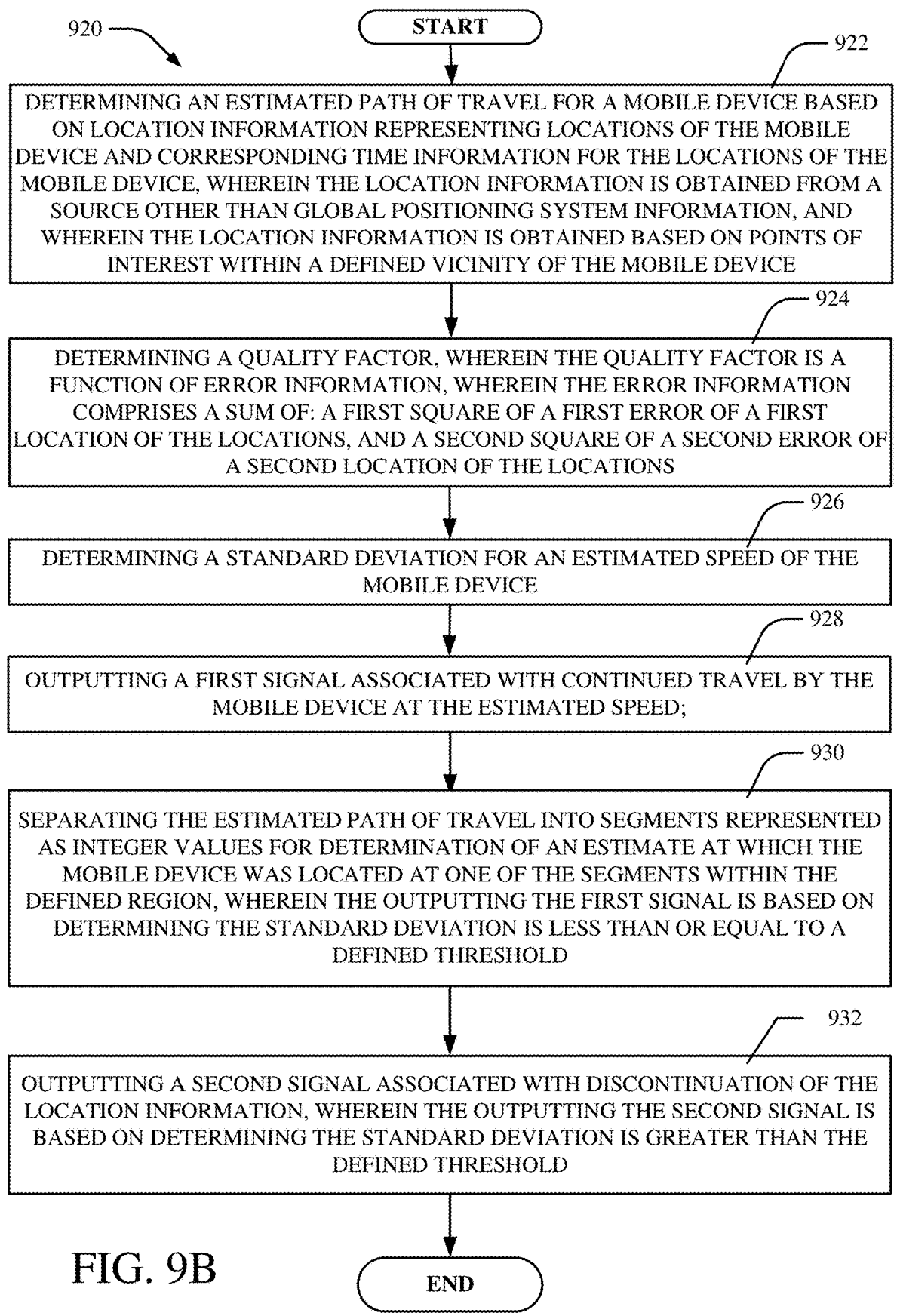

Turning now to FIG. 9B, at 922, operations 920 can comprise determining an estimated path of travel for a mobile device based on location information representing locations of the mobile device and corresponding time information for the locations of the mobile device, wherein the location information is obtained from a source other than global positioning system information, and wherein the location information is obtained based on points of interest within a defined vicinity of the mobile device.

At 924, operations 920 can comprise determining a quality factor, wherein the quality factor is a function of error information, wherein the error information comprises a sum of: a first square of a first error of a first location of the locations, and a second square of a second location of the locationS.

At 926, operations 920 can comprise determining a standard deviation for an estimated speed of the mobile device.

At 928, operations 920 can comprise outputting a first signal associated with continued travel by the mobile device at the estimated speed.

At 930, operations 920 can comprise separating the estimated path of travel into segments represented as integer values for determination of an estimate at which the mobile device was located at one of the segments within the defined region, wherein the outputting the first signal is based on determining the standard deviation is less than or equal to a defined threshold.

At 932, operations 920 can comprise outputting a second signal associated with discontinuation of the location information, wherein the outputting the second signal is based on determining the standard deviation is greater than the defined threshold.

Figure 9C:
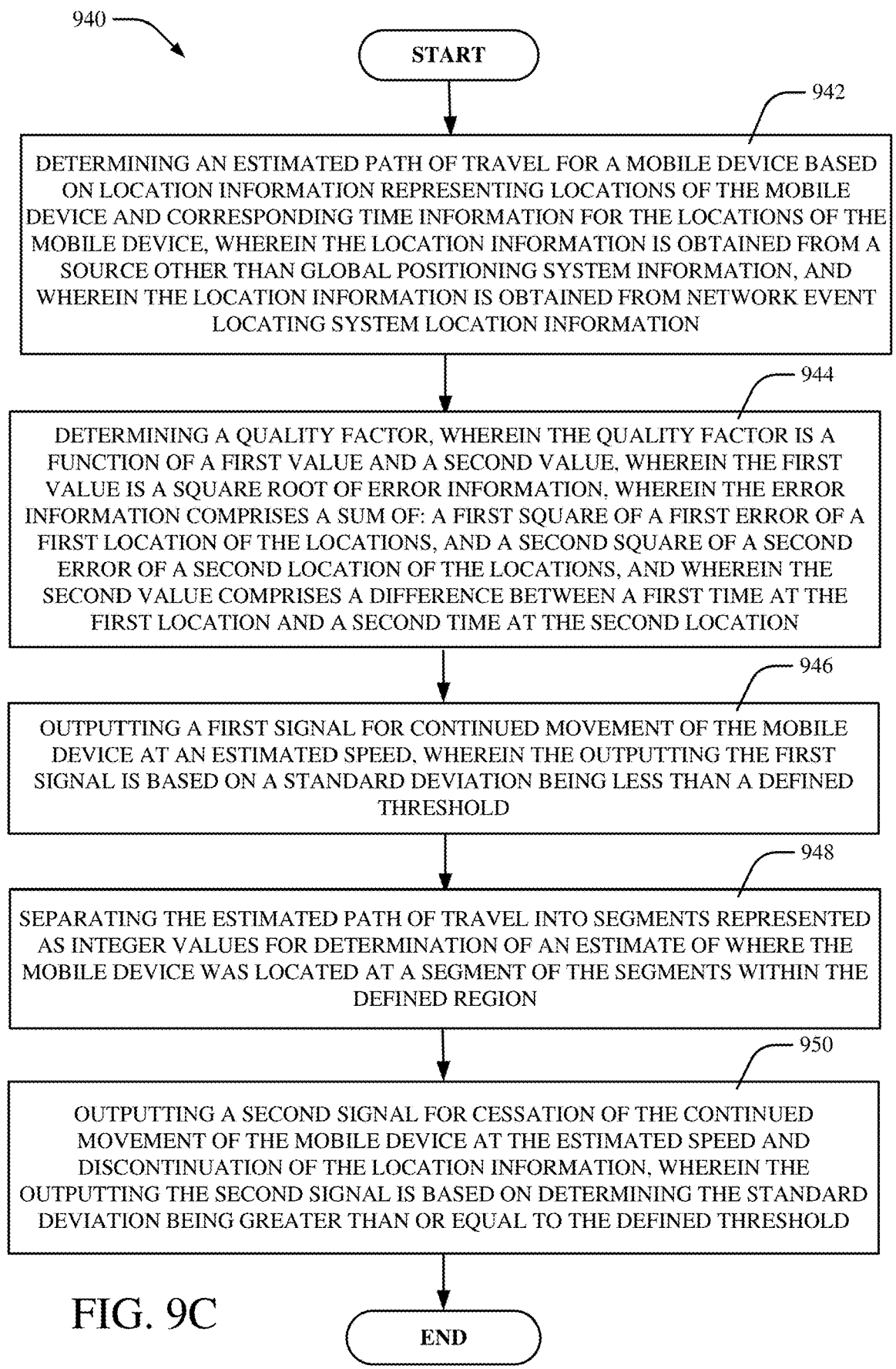

Turning now to FIG. 9C, at 942, operations 940 can comprise determining an estimated path of travel for a mobile device based on location information representing locations of the mobile device and corresponding time information for the locations of the mobile device, wherein the location information is obtained from a source other than global positioning system information, and wherein the location information is obtained from network event locating system location information.

At 944, operations 940 can comprise determining a quality factor, wherein the quality factor is a function of a first value and a second value, wherein the first value is a square root of error information, wherein the error information comprises a sum of: a first square of a first error of a first location of the locations, and a second square of a second error of a second location of the locations, and wherein the second value comprises a difference between a first time at the first location and a second time at the second location.

At 946, operations 940 can comprise outputting a first signal for continued movement of the mobile device at an estimated speed, wherein the outputting the first signal based on a standard deviation being less than a defined threshold.

At 948, operations 940 can comprise separating the estimated path of travel into segments represented as integer values for determination of an estimate of where the mobile device was located at a segment of the segments within the defined region.

At 950, operations 940 can comprise outputting a second signal for cessation of the continued movement of the mobile device at the estimated speed and discontinuation of the location information, wherein the outputting the second signal is based on determining the standard deviation being greater than or equal to the defined threshold.

Figure 10:
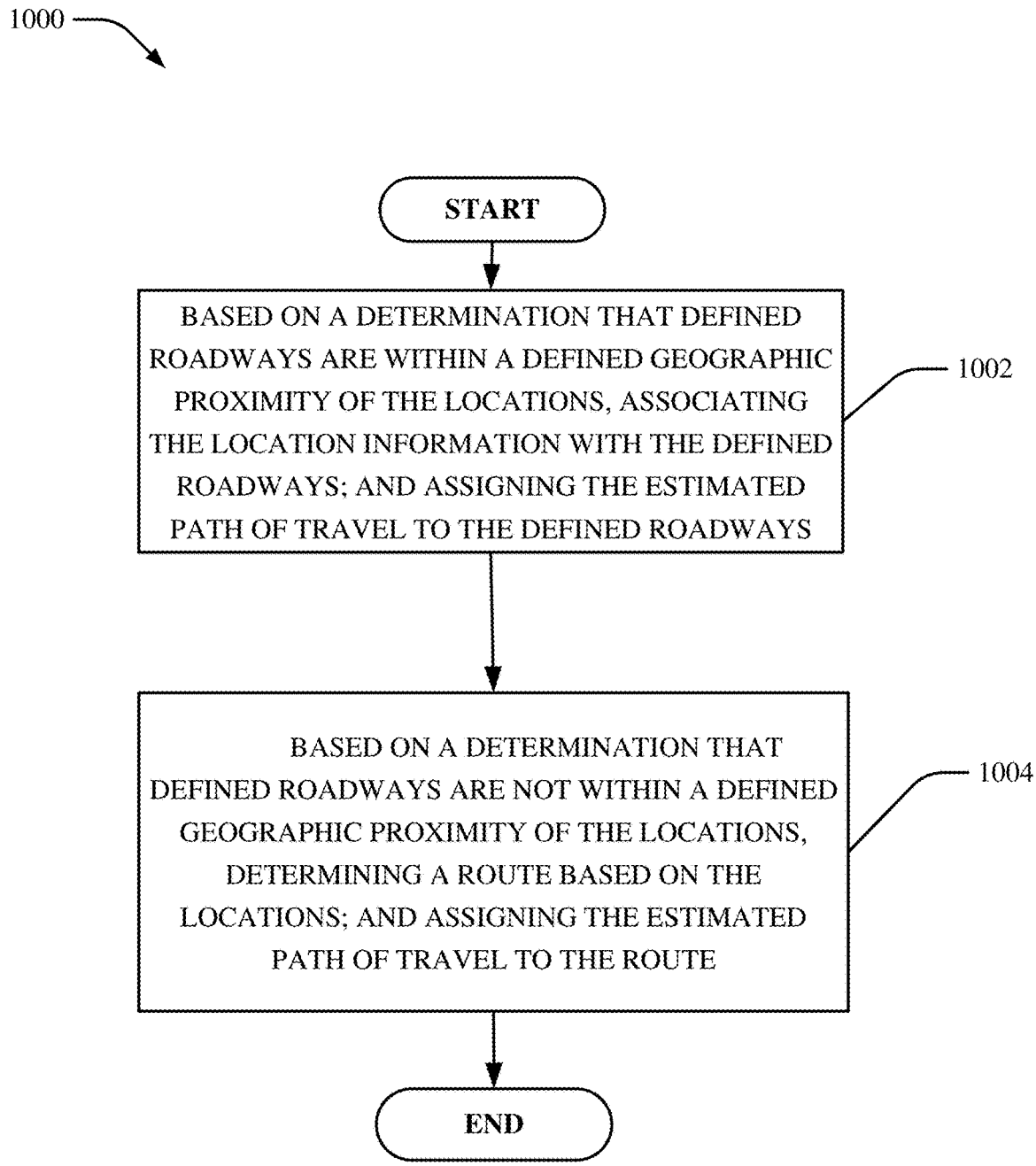

FIG. 10 further describes the determination of whether the estimated path of travel traverses the defined region described at 904 of FIG. 9A. At 1002, method 1000 can comprise, based on a determination that defined roadways are within a defined geographic proximity of the locations, associating the location information with the defined roadways, and assigning the estimated path of travel to the defined roadways. At 1004, method 1000 can comprise, based on a determination that defined roadways are not within a defined geographic proximity of the locations, determining a route based on the locations, and assigning the estimated path of travel to the route.

Figure 11:
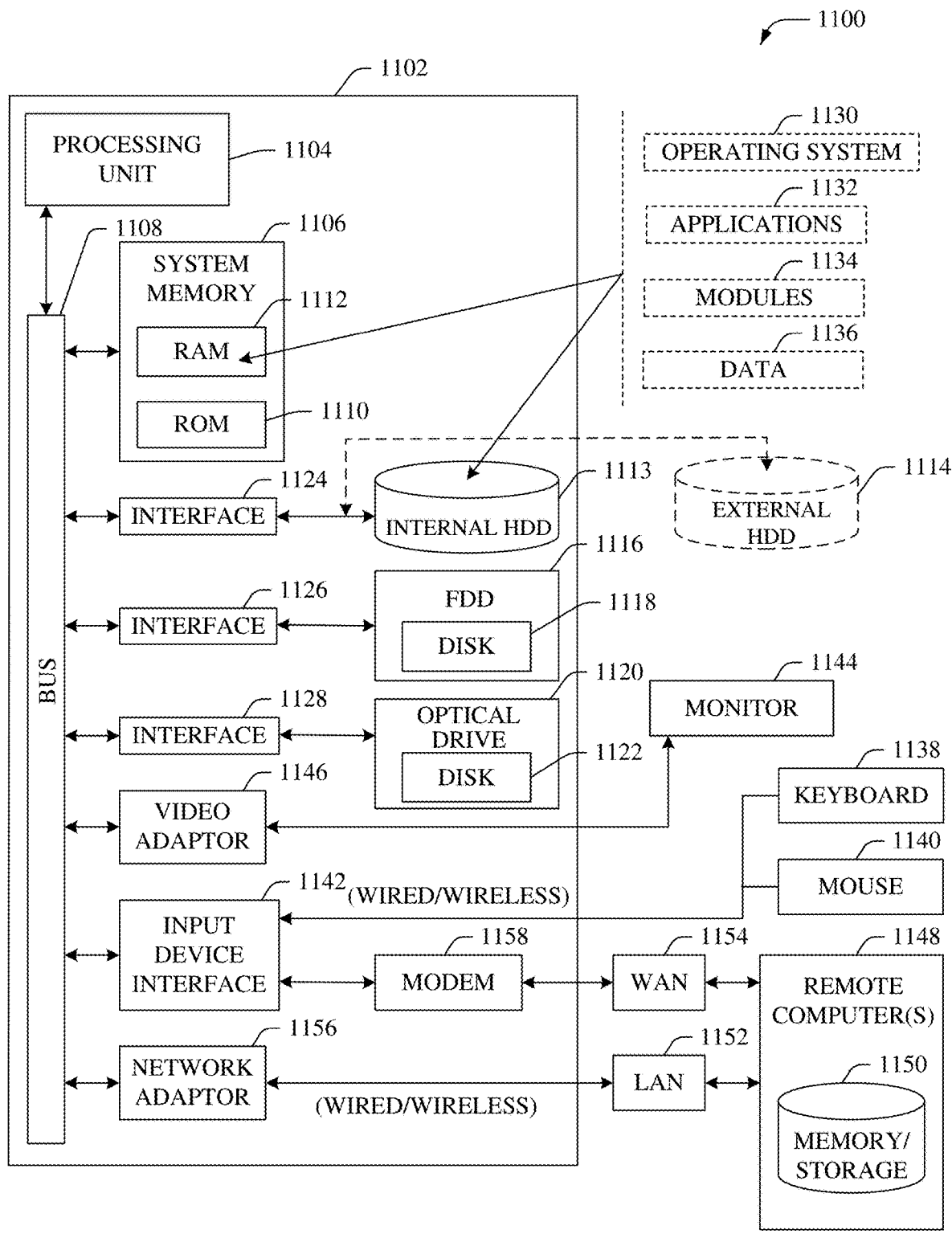
FIG. 11 illustrates a block diagram of a computer operable to facilitate estimation of presence inside a defined region in accordance with one or more embodiments described herein.

FIG. 11 illustrates a block diagram of a computer operable to facilitate estimation of presence inside a defined region in accordance with one or more embodiments described herein. For example, in some embodiments, the computer can be or be comprised within any number of components described herein including, but not limited to, estimation device 102, mobile device 106 (or any components of estimation device 102 and/or mobile device 106).

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 11, the example environment 1100 for implementing various embodiments of the embodiments described herein comprises a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multiprocessor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also comprise a high-speed RAM such as static RAM for caching data.

The computer 1102 further comprises an internal hard disk drive (HDD) 1113 (e.g., EIDE, SATA), which internal hard disk drive 1113 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface, respectively. The interface 1124 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A mobile device can enter commands and information into the computer 1102 through one or more wired/wireless input devices, e.g., a keyboard 1138 and a pointing device, such as a mouse 1140. Other input devices (not shown) can comprise a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1394 serial port, a game port, a universal serial bus (USB) port, an IR interface, etc.

A monitor 1144 or other type of display device can be also connected to the system bus 1108 via an interface, such as a video adapter 1146. In addition to the monitor 1144, a computer typically comprises other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also comprise a wireless AP disposed thereon for communicating with the wireless adapter 1156.

When used in a WAN networking environment, the computer 1102 can comprise a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    determining, by a device comprising a processor, an estimated path of travel for a mobile device based on location information representing locations of the mobile device and corresponding time information for the locations of the mobile device, wherein the location information is obtained from a source other than global positioning system information;
    based on the corresponding time information for the locations of the mobile device, determining, by the device, whether the estimated path of travel traverses a defined region comprising a defined point of interest at a defined time of interest;
    determining, by the device, quality information representative of a quality factor indicative of a level of accuracy of the location information,
        wherein the quality factor is determined based on a first value and a second value, wherein the first value is representative of error information determined based on at least a sum of: a first square of a first error of a first location of the locations of the mobile device, and a second square of a second error of a second location of the locations of the mobile device, wherein the second value comprises a difference between a first time at the first location and a second time at the second location, and wherein the quality factor is a function of the first value being divided by the second value;
    determining, by the device, a standard deviation for an estimated speed of the mobile device;
    outputting, by the device, a first signal to continue use of the estimated speed of the mobile device to determine that the estimated path of travel traverses the defined region and to separate the estimated path of travel into segments represented as integer values for determination of an estimate of where the mobile device was within the defined region, wherein the outputting the first signal is based on determining that the standard deviation is less than a defined threshold; and
    outputting, by the device, a second signal to discontinue the use of the estimated speed of the mobile device and discontinue usage of the location information, wherein the outputting the second signal is based on determining that the standard deviation is greater than or equal to the defined threshold.

2. The method of claim 1, wherein the location information is obtained from a wireless fidelity access point in a defined proximity of the mobile device, and wherein the determining whether the estimated path of travel traverses the defined region comprises:
    based on defined roadways being determined to be within a defined geographic proximity of the locations,
        associating the location information with the defined roadways; and
        assigning the estimated path of travel to the defined roadways; and
    based on the defined roadways being determined not to be within the defined geographic proximity of the locations,
        determining a route based on the locations; and
        assigning the estimated path of travel to the route.

3. The method of claim 2, wherein the determining whether the estimated path of travel traverses the defined region further comprises:
    determining a synthetic location based on the estimated path of travel at the defined time of interest.

4. The method of claim 3, wherein the determining whether the estimated path of traverse the defined region further comprises:
    determining whether the synthetic location at the defined time of interest is within the defined region.

5. The method of claim 2, wherein, in response to the defined roadways being determined not to be within the defined geographic proximity of the locations, the determining the route comprises:
    determining a third location of the locations at a third time and determining a fourth location of the locations at a fourth time.

6. The method of claim 5, further comprising:
    determining a route region representing the route between the third location and the fourth location based on interpolating between the third location and the fourth location.

7. The method of claim 2, wherein, in response to the defined roadways being determined not to be within the geographic proximity of the locations, the determining the route comprises:
    interpolating between a third location of the locations of the mobile device and a fourth location of the locations of the mobile device.

8. The method of claim 1, further comprising: determining, by the device, that the first error or the second error is too large relative to a distance traveled by the mobile device and a time of travel by the mobile device, wherein the determining is based on determining that the standard deviation is greater than or equal to the defined threshold.

9. An apparatus, comprising:
    a processor; and
    a memory that stores executable instructions that, when executed by the processor, facilitate performance of operations, comprising:
        determining an estimated path of travel for a mobile device based on location information representing locations of the mobile device and corresponding time information for the locations of the mobile device, wherein the location information is obtained from a source other than global positioning system information, and wherein the location information is obtained based on points of interest within a defined vicinity of the mobile device; and determining a quality factor, wherein the quality factor is a function of error information, wherein the error information comprises a sum of:
  a first square of a first error of a first location of the locations, and
  a second square of a second error of a second location of the locations;
determining a standard deviation for an estimated speed of the mobile device;
outputting a first signal associated with continued travel by the mobile device at the estimated speed;
separating the estimated path of travel into segments represented as integer values for determination of an estimate at which the mobile device was located at one of the segments within the defined region, wherein the outputting the first signal is based on determining the standard deviation is less than or equal to a defined threshold; and
outputting a second signal associated with discontinuation of the location information, wherein the outputting the second signal is based on determining the standard deviation is greater than the defined threshold.

10. The apparatus of claim 9, wherein the operations further comprise:
based on the corresponding time information for the locations of the mobile device, determining whether a location on the estimated path of travel is within a defined region within a defined time period of interest, wherein the determining whether the estimated path of travel is within the defined region comprises:
based on the determining indicating that defined roadways are within a defined geographic proximity of the locations,
  associating the location information with the defined roadways; and
  assigning the estimated path of travel to the defined roadways.

11. The apparatus of claim 10, wherein the operations further comprise:
based on the determining indicating that the defined roadways are not within a defined geographic proximity of the locations,
  determining a route based on the locations; and
  assigning the estimated path of travel to the route.

12. The apparatus of claim 11, wherein the determining whether the estimated path of travel traverses the defined region further comprises:
identifying a construction delay occurring with respect to the estimated path of traffic;
predicting a reduced traffic speed based on the construction delay, resulting in a predicted reduced traffic speed;
determining that the mobile device is traveling at a speed no greater than the predicted reduced traffic speed; and
determining a synthetic location on the estimated path of travel within the defined time period of interest, wherein the synthetic location is based on the predicted reduced traffic speed for the mobile device.

13. The apparatus of claim 11, wherein, in response to the determining that the defined roadways are not within the defined geographic proximity of the locations, the determining the route comprises:
determining a third location of the locations at a third time and determining a fourth location of the locations at a fourth time; and
determining a route region representing the route between the third location and the fourth location based on interpolating between the third location and the fourth location.

14. The apparatus of claim 11, wherein the defined time period of interest is a first defined time period of interest, and wherein, in response to the determining that the defined roadways are not within a geographic proximity of the locations, the determining the route comprises:
interpolating between the first location of the locations of the mobile device within the defined time period of interest and the second location of the locations of the mobile device.

15. The apparatus of claim 14, wherein the first defined time period of interest and the second defined time period of interest are included within the corresponding time information.

16. The apparatus of claim 9, wherein the operations further comprise:
determining quality data indicative of the quality factor, and wherein the quality factor represents a level of accuracy of the location information.

17. The apparatus of claim 16, wherein the operations further comprise:
discarding the location information based on a determination that the quality factor has satisfied a defined condition, and wherein the quality factor is a function of a first error of the first location of the locations and a second error of the second location of the locations; and
employing a clean-up process for permanent removal of the location information after a defined amount of time.

18. A non-transitory machine-readable storage medium, comprising executable instructions that, when executed by a processor, facilitate performance of operations, comprising:
determining an estimated path of travel for a mobile device based on location information representing locations of the mobile device and corresponding time information for the locations of the mobile device, wherein the location information is obtained from a source other than global positioning system information, and wherein the location information is obtained from network event locating system location information;
determining a quality factor, wherein the quality factor is a function of a first value and a second value, wherein the first value is a square root of error information, wherein the error information comprises a sum of: a first square of a first error of a first location of the locations, and a second square of a second error of a second location of the locations, and wherein the second value comprises a difference between a first time at the first location and a second time at the second location,
outputting a first signal for continued movement of the mobile device at an estimated speed, wherein the outputting the first signal is based on a standard deviation being less than a defined threshold;
separating the estimated path of travel into segments represented as integer values for determination of an estimate of where the mobile device was located at a segment of the segments within the defined region; and
outputting a second signal for cessation of the continued movement of the mobile device at the estimated speed and discontinuation of the location information, wherein the outputting the second signal is based on determining the standard deviation being greater than or equal to the defined threshold.

19. The non-transitory machine-readable storage medium of claim 18, wherein the operations further comprise determining whether the estimated path of travel traverses a defined region based on a determination that defined roadways are within a defined geographic proximity of the locations.

20. The non-transitory machine-readable storage medium of claim 19, wherein the operations further comprise:
associating the location information with the defined roadways; and assigning the estimated path of travel to the defined roadways.

* * * * *